(12) United States Patent
Hel-Or et al.

(10) Patent No.: US 7,930,145 B2
(45) Date of Patent: Apr. 19, 2011

(54) PROCESSING AN INPUT SIGNAL USING A CORRECTION FUNCTION BASED ON TRAINING PAIRS

(75) Inventors: Yacov Hel-Or, Zichron Yaakov (IL); Doron Shaked, K. Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1174 days.

(21) Appl. No.: 11/554,183

(22) Filed: Oct. 30, 2006

(65) Prior Publication Data
US 2008/0103717 A1    May 1, 2008

(51) Int. Cl.
*G06F 17/40*  (2006.01)
*G06F 17/00*  (2006.01)

(52) U.S. Cl. ......... 702/189; 702/106; 702/193; 708/400

(58) Field of Classification Search .................. 702/189, 702/106, 124, 126, 193
See application file for complete search history.

(56) References Cited

U.S. PATENT DOCUMENTS

| | | | |
|---|---|---|---|
| 5,774,375 A * | 6/1998 | Behrent | 702/106 |
| 6,337,927 B1 * | 1/2002 | Elad et al. | 382/225 |
| 6,470,469 B1 * | 10/2002 | Chou et al. | 714/746 |

* cited by examiner

*Primary Examiner* — Hal D Wachsman (57) ABSTRACT

A method of processing, by a computer, an input signal including obtaining input signal samples that represents a physical quantity. The method includes transforming the samples from an original domain into a plurality of coefficients in a transform domain, using an over-complete transform, such that the plurality of coefficients is sufficient to redundantly reconstruct the input signal samples. The method also includes modifying the coefficients independently of each other by applying a correction function, obtaining a set of corrected coefficients. The method also includes transforming the set of corrected coefficients back to the original domain. In the method, the correction function is determined by using a set of training pairs, each training pair including an uncorrected signal and a corrected signal, and by reducing a specified aggregate measure of error between the uncorrected signal and the corrected signal in the original domain across the training pairs.

20 Claims, 7 Drawing Sheets

PROCESSING AN INPUT SIGNAL USING A CORRECTION FUNCTION BASED ON TRAINING PAIRS

FIELD OF THE INVENTION

The present invention pertains to signal-processing techniques and is applicable to processing a variety of different types of signals, including image signals, audio signals and other signals representing physical quantities.

BACKGROUND

Many imaging devices that acquire or process digital images introduce artifacts in the processing pipeline. These artifacts include: additive noise, image blurring, compression artifacts, missing pixels, geometric distortions, etc. Image restoration is an attempt to reduce such artifacts using post-processing operations. One important field within image restoration deals with image denoising.

A noisy image can be expressed mathematically as follows:

$$y = x + n, \quad (1.1)$$

where y is the observed image, x is the unknown original image and n is contaminating noise (all in vector notation). The goal in image restoration is to reconstruct the original image x given the noisy measurement y. This problem is a typical instance of an inverse problem, and the conventional solutions typically consider prior knowledge regarding the distribution of x.

A common approach for modeling the statistical prior of natural images is to estimate their statistical distribution in a transform domain. This is usually implemented using some type of wavelet transform. The main motivation for this approach stems from the fact that the wavelet transform of natural images tends to de-correlate pixel values. Hence, it is possible to make a reasonable inference on the joint distribution of the wavelet coefficients from their marginal distributions. When dealing with image denoising, this leads to a family of classical techniques known as the wavelet shrinkage methods. These techniques amount to modifying the coefficients in the transform domain using a set of scalar mapping functions, $\{M^i\}$, called shrinkage functions (SF).

The shrinkage approach first performs a wavelet transform:

$$y_w = Wy$$

followed by a correction step in which the wavelet coefficients are rectified according to a set of shrinkage functions (SFs):

$$\hat{x}_w = \vec{M}_w \{y_w\}$$

where $\vec{M}_w = [M_w^1, M_w^2, \ldots]$ is a vector of scalar mapping functions. The denoised image then is obtained after applying the inverse transform to the modified coefficients:

$$\hat{x} = W^{-1} \hat{x}_w$$

Due to their simplicity and good results, shrinkage approaches have received a great deal of attention over the last decade. Hundreds of shrinkage methods have been proposed, differing mostly in the type of transform used and in the form in which the SFs are applied. The justification for applying a marginal (scalar) SF to each coefficient independently can be shown to emerge from the independence assumption of the wavelet coefficients. This assumption was postulated in the early studies in which SFs were applied to unitary transforms.

Various efforts have been made to improve the denoising results of shrinkage methods. Such efforts generally concentrate on two main approaches. The first approach attempts to improve the results by abandoning the unitary representation and working in over-complete transform domains. Such transforms include the un-decimated wavelets, steerable wavelets, ridgelets, contourlets, and curvelets. Although the independence assumption cannot be justified in the over-complete domain, most of the conventional methods naively borrow the traditional SFs from the unitary case.

The second approach toward improvement relaxed the independence assumption of the wavelet coefficients and concentrated on modeling the statistical dependencies between neighboring coefficients. This scheme can be seen as diverging from the scalar SFs to multivariate SFs where transform coefficients are rectified according to a group of measured coefficients. Inter-coefficient dependencies are exploited, using any of a range of techniques such as: joint sparsity assumption, HMM and Bayesian models, context modeling, tree models representing parent-child dependencies, co-occurrence matrix, adaptive thresholding, and more. These types of techniques sometimes achieve good denoising performance. However, they generally lack the efficiency and simplicity of the classical shrinkage approaches.

Common to all the conventional techniques for generating SFs, regardless of the approach used, is that the SFs are derived in a descriptive manner. Namely, a statistical model is first constructed describing the statistical prior of the transform coefficients. Based on this prior, a set of SFs are derived (scalar or multivariate, parametric or non-parametric) designed to rectify the contaminated coefficients. Clearly, imprecise modeling of the statistical prior leads directly to a deterioration in the resulting performance. Because inter-coefficient dependencies are complicated to model, in particular in the over-complete case, it is expected that the statistical models are far from being precise. In fact, due to the high dimensionality of the joint probability, ad-hoc assumptions commonly have been made in order to make the problem tractable. Such assumptions include, e.g., ignoring the inter-coefficient dependencies, modeling only bivariate or parent-child dependencies, and modeling the joint dependencies of a small group of neighboring coefficients while assuming simplified parametric models.

SUMMARY OF THE INVENTION

In one aspect, the invention is directed to systems, methods and techniques for processing an input signal. In one representative embodiment, samples of an input signal that represent a physical quantity are obtained and then transformed from an original domain into a plurality of coefficients in a transform domain, using an over-complete transform, such that the plurality of coefficients is sufficient to redundantly reconstruct the input signal samples. The coefficients are then modified independently of each other by applying a correction function, thereby obtaining a set of corrected coefficients, and the set of corrected coefficients is transformed back to the original domain. According to this embodiment, the correction function was determined by using a set of training pairs, each training pair including an uncorrected signal and a corrected signal, and by reducing a specified aggregate measure of error between the uncorrected signal and the corrected signal in the original domain across the training pairs.

In another aspect, the invention is directed to systems, methods and techniques for generating a correction function for use in signal processing. Initially, a set of training pairs is obtained, each training pair including a base signal and a target signal, each representing a physical quantity. In addition, an original set of defined values that is constant across the set of training pairs is obtained. Samples are specified for the base signals as linear combinations of the defined values in the original set, and the original set of defined values are replaced with a new set of defined values that result in modified base signals when the linear combinations are applied, the new set having been selected so as to achieve a specified goal relating to a comparison between the modified base signals and the target signals across the set of training pairs. Finally, a correction function is identified based on a comparison between the original set of defined values and the new set of defined values.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

The present invention provides, inter alia, techniques for designing a set of shrinkage functions (SFs) using a discriminative framework. In contrast to conventional approaches, these techniques generally do not require any estimation of the prior model or the noise characteristics. Rather, in the preferred embodiments a set of SFs is constructed using an ensemble of example images whose clean and contaminated versions are supplied off-line. The SFs are designed to perform "optimally" with respect to the given examples under the assumption that they will perform equally well with similar new examples.

In the preferred embodiments, scalar SFs are applied to each wavelet coefficient independently. However, the construction of the SFs still considers inter-coefficient dependencies. In fact, the obtained SFs differ from the conventional monotonic functions. Moreover, despite the fact that scalar SFs are used, the denoising results generally are comparable to or better than the state-of-the-art multivariate prior-based techniques. Thus, the present invention, while maintaining the simplicity and efficiency of the scalar shrinkage approaches, typically does not compromise the resulting quality.

The advantages of the preferred embodiments of the present invention stem, in part, from the following sources:

First, the SFs preferably are constructed in an optimal manner taking into account inter-coefficient dependencies. Although the SFs are non-linear, their construction is performed in a closed form solution using a new representation which is referred to as *The Slicing Transform* (SLT). The SLT is a representation in which non-linear mapping operations are represented linearly. This property permits the optimal set of SFs to be identified as a solution of a least-squares problem.

The second source of improvement stems from the optimality criteria applied in the preferred embodiments. While most shrinkage approaches optimize the solution with respect to the maximum a-posteriori (MAP) criterion (see Eq. (1.2) below), the preferred techniques optimize with respect to the minimum squared error (MSE). Because the MAP solution considers only the most probable case, it is possible that the method performs poorly with cases that are not the most probable but are likely. This leads to performance attenuation in the average case. The MAP objective commonly is adopted in denoising techniques due to its mathematical simplicity. However, using the discriminative approach of the present invention the MSE objective typically can be applied more efficiently than in many conventional techniques.

The third source of improvement is due to the domain in which the optimality criterion preferably is performed. In the preferred embodiments of the invention, the objective goal is specified with respect to the original domain (e.g., with respect to images, the spatial domain, which is the domain in which the images are perceived). Most wavelet shrinkage approaches use optimality criteria expressed in the wavelet domain. While a transform-domain optimization criterion typically is justified in unitary transforms, it is not properly extended to over-complete transforms. Rather, it can be shown that the optimal solution in the over-complete transform domain does not guarantee optimality in the spatial domain.

The techniques described below generally are presented in the context of denoising. However, such techniques can be extended beyond the noise-reduction problem in a similar manner to other reconstruction, correction or general processing problems, such as image de-blurring, image up-scaling, and the like, as long as the process can be implemented using scalar look-up-tables applied in the wavelet (or other transform) domain or, for that matter, in the original domain.

Similarly, much of the discussion below refers to wavelet transforms. However, it should be understood that the present techniques also apply to a variety of different transforms, (e.g., linear transforms).

Finally, the discussion below focuses on the particular problem of correcting an image. However, it should be understood that the same techniques can be applied in a straightforward manner to the correction or processing of other types of signals, with images simply being an exemplary case.

Section I of the following disclosure generally discusses how to generate correction functions according to the preferred embodiments. Section II describes a general technique for correcting an image or other signal according to the preferred embodiments of the invention. Section III describes various adaptive techniques of correcting an image with the correction functions according to the preferred embodiments of the invention. Section IV describes additional preferred embodiments, and Section V describes mathematical and theoretical background, analysis, and support for embodiments of the invention.

I. Correction Function Generation

Techniques for generating signal-correction functions according to certain representative embodiments of the present invention are now described with reference to the flow diagram in FIG. 1. The technique shown in FIG. 1 can be implemented in software, hardware, firmware or any combination thereof. Additional detail regarding the mathematical foundations for such techniques is described in subsequent sections, including section V(c) entitled "The Slicing Transform and its Properties", section V(d) entitled "Image Restoration Using the SLT" and section V(e) entitled "Implementation Considerations". At certain points in the following discussion, specific references are made to formulae derived in subsequent section V. Such references should be understood as being exemplary only.

Figure 1:
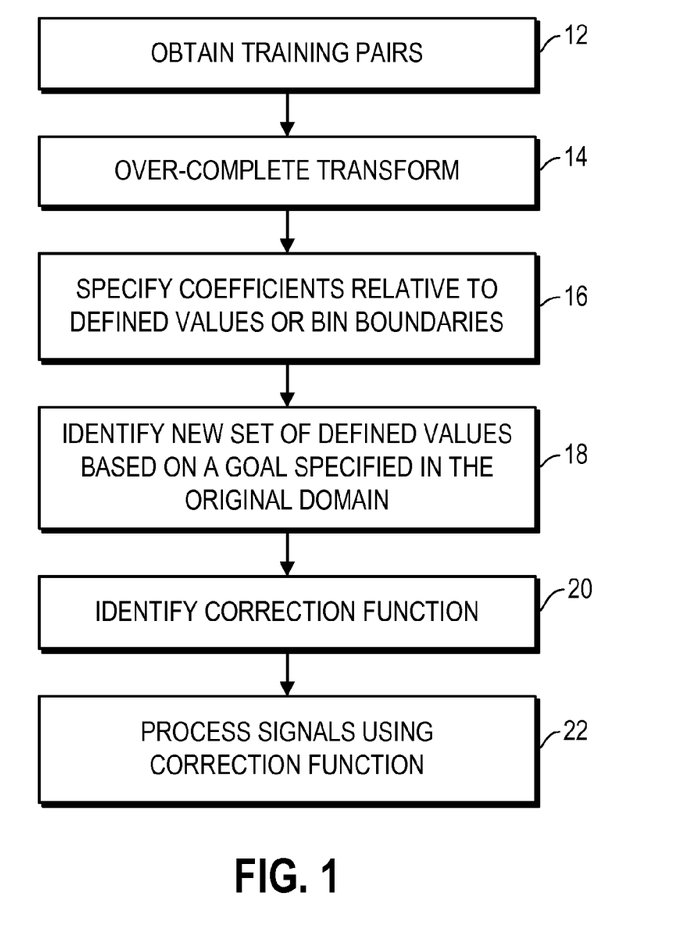
FIG. 1 is a flow diagram illustrating techniques for generating correction functions according to certain representative embodiments of the present invention.

Initially, in step 12 of FIG. 1, pairs of training signals are obtained. Each pair includes two related signals, a "target" signal x and a "base" signal y, both typically representing the same underlying physical quantity (e.g., a clean image x and the same image but with noise added y ). As used herein, a "physical quantity" includes any observable phenomenon, such as an image, a sound, a physical pressure, any aspect of motion, electrical charge or voltage, temperature or radiation.

As indicated, y might be a noisy version of x. Alternatively, y might be a blurred version of x or any other corrupted version resulting from an undesired process that has been applied to x. Still further, in certain cases y is in fact the original signal and x is an enhanced version of y. In any event, for the present purposes y represents the starting or base signal which needs to be "corrected" (which can include any type of processing) and x represents the goal or target signal that is desired to be achieved after applying the generated correction.

It is noted that, for ease of illustration and conceptualization, in the representative embodiments described herein x and y generally are assumed to be image signals. However, the techniques of the present invention can be applied to any other type of signal as well, including audio signals, video signals, and signals generated from a sensor measuring any conceivable physical quantity, such as medical sensors, radiation sensors, weather sensors or seismological sensors.

The training samples can be obtained in this step 12 in any of a number of different ways. According to one, a plurality of original signals x might be subjected to a known process that results in noise or other artifacts (which one would like to eliminate or reverse), thereby generating the y signals. One example is to take a number of known images and scan them using a particular model of scanner. The resulting scans y will not be perfect copies of the originals x, but instead will have some artifacts resulting from the scanning process.

In another approach, which might be used, e.g., if the corrupting process is not readily reproducible (such as the effects of years of aging under certain environmental conditions), the corrupting process is statistically modeled and then simulated mathematically.

Still further, in certain circumstances one might initially have only corrupted signals y, but not their corresponding originals x, and also might not readily be able to statistically model the corrupting process. In such cases, the corrupted samples y preferably are manually enhanced to create the target signals x. The same approach can be employed where y is in fact the original and one wishes to train an automated application to perform enhancements (e.g., removing certain image details) that previously have been performed manually.

In step 14, the training sample signals, both the x signals and the y signals, are transformed from the original signal domain (e.g., the spatial domain for an image or the time domain for an audio signal), preferably using an over-complete transformation. As noted above, an over-complete transformation results in multiple coefficients for each original sample or, more specifically, results in a number of coefficients that permit redundant reconstruction of the original signal, with the redundancy factor commonly being more than 4, 8 or 16. As also noted above, over-complete transformations frequently provide better results than unitary transformations but at the cost of introducing inter-coefficient dependencies, and those dependencies have not been adequately addressed in the conventional techniques.

As also noted above, one example of an over-complete transformation is to use a discrete cosine transformation (DCT), a wavelet transformation, or any other orthogonal transformation, but to apply such an orthogonal transformation in an overlapping manner, such that each sample is used in multiple instantiations of the base transformation that is being applied. Other (non-overlapping) examples of over-complete transformations include ridgelets, contourlets, and curvelets. In any event, upon completion of the over-complete transformation the transform-domain coefficients typically will have significant inter-coefficient dependencies.

In step 16, the transform-domain coefficients $y_T$ generated for the y signals in step 14 are specified relative to defined bin boundaries (or defined values). It is noted that the concept of bins and bin boundaries is useful in helping to conceptualize the preferred embodiments of the present invention. However, as discussed below, the present invention can be generalized beyond the concept of coefficient (or signal) values falling within a particular bin, to include linear combinations of any set (or vector) of defined values.

According to the present embodiment, the anticipated range of values for each coefficient is divided into adjacent bins, with the boundaries between bins specified based on the desired accuracy for approximating a continuous correction function. As used herein, the term "correction function" is intended to mean the overall function for correcting an input signal (or portion thereof) y in order to obtain a desired approximation $\hat{x}$ of the target signal x (or portion thereof) and, thus, typically includes a collection of shrinkage functions corresponding to the different coefficients or different coefficient bands. As used herein, a coefficient band, with respect to a particular transform, corresponds to coefficients of the same type (e.g., for a DCT, the coefficients corresponding to the same frequency).

Figure 2:
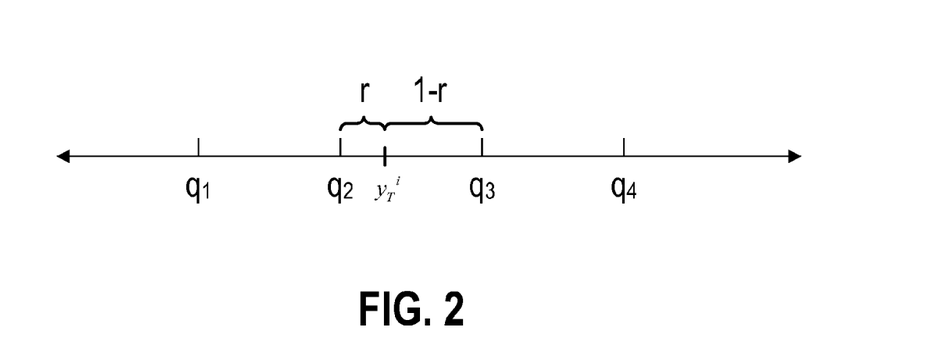
FIG. 2 illustrates how a coefficient value is defined against bin boundary values according to a representative embodiment of the present invention.

In the preferred embodiments, at step 16 each coefficient value is expressed as a weighted average (or, more generally, a linear combination) of the bin boundaries (or defined values) immediately lower and immediately higher than the subject coefficient value. Thus, as shown in FIG. 2, coefficient value $y_T^i$ is located at a point that is a fraction r of the distance between boundaries $q_2$ and $q_3$. Accordingly, its value is expressed as $q_2+r(q_3-q_2)$ or $q_2(1-r)+q_3 r$.

In this manner, the individual values of the $y_T$ coefficients are transformed, using the slicing transform (SLT) defined against a vector of bin boundaries (or defined values) $q=[q_0, q_1, \ldots, q_M]^T$, resulting in a transform matrix $S_q(y_T)$, as defined in Equation (1.18) below, such that $y_T$ can be recovered as $y_T = S_q(y_T)q$ In the example shown in FIG. 2, the bin boundaries $q_i$ are illustrated as being equally spaced. However, for the reasons explained in Section V(e) below, in the preferred embodiments of the invention non-uniform intervals are used, with smaller intervals (closer spacing) at the lower values and larger intervals (wider spacing) at the higher values.

Referring back to FIG. 1, in step 18 a new set of bin boundaries (or, more generally, defined values) is determined. Using the notation set forth below (e.g., in section V), a vector p is identified, such that the p, q combination defines a piecewise linear mapping (or function) of the coefficient values $y_T$.

In the preferred embodiments, p is calculated as set forth in Equations (1.30) and (1.31) below (see section V below). More generally, p preferably is calculated so as to achieve a specified goal relating to a comparison between the modified base signals $\hat{x}_T = S_q(y_T)p$ and the target signals $x_T$ across the entire set of training pairs. Again, the T subscript denotes the transformed version of the signal generated in step 14 above (e.g., using an over-complete transform).

More preferably, that specified goal is specified in the original domain (e.g., as a minimization of error, such as the minimum square error), but also has an equivalent closed-form expression in the transform domain. As a result, a solution (e.g., for p) can be obtained in the transform domain which achieves the desired goal in the original domain.

It is noted that by virtue of the fact that the SLT permits a piecewise linear function to be expressed as a linear operation (e.g., on a set of defined values q) manipulations in the transform domain can be optimized in the original domain in a closed-form manner. As discussed in more detail below (e.g., in section V), this result permits, e.g., scalar corrections to be applied in an "optimal" manner in an over-complete transform domain (in which inter-coefficient dependencies are taken into account).

In step 20, a correction function is identified based on the modified bin boundaries (or, more generally, defined values) p obtained in step 18. Continuing with the present example, a piecewise linear correction function is identified in the manner discussed below, e.g. in sections V(c) and V(d). This correction function then may be stored, e.g., as a function, as a lookup table or simply as the vector pair p, q.

Finally, in step 22 the stored correction function is then used in order to process new incoming signals. Step 22 is discussed in more detail in section II below, with reference to FIG. 3.

II. Processing an Imput Signal Using Generated Correction Functions

Figure 3:
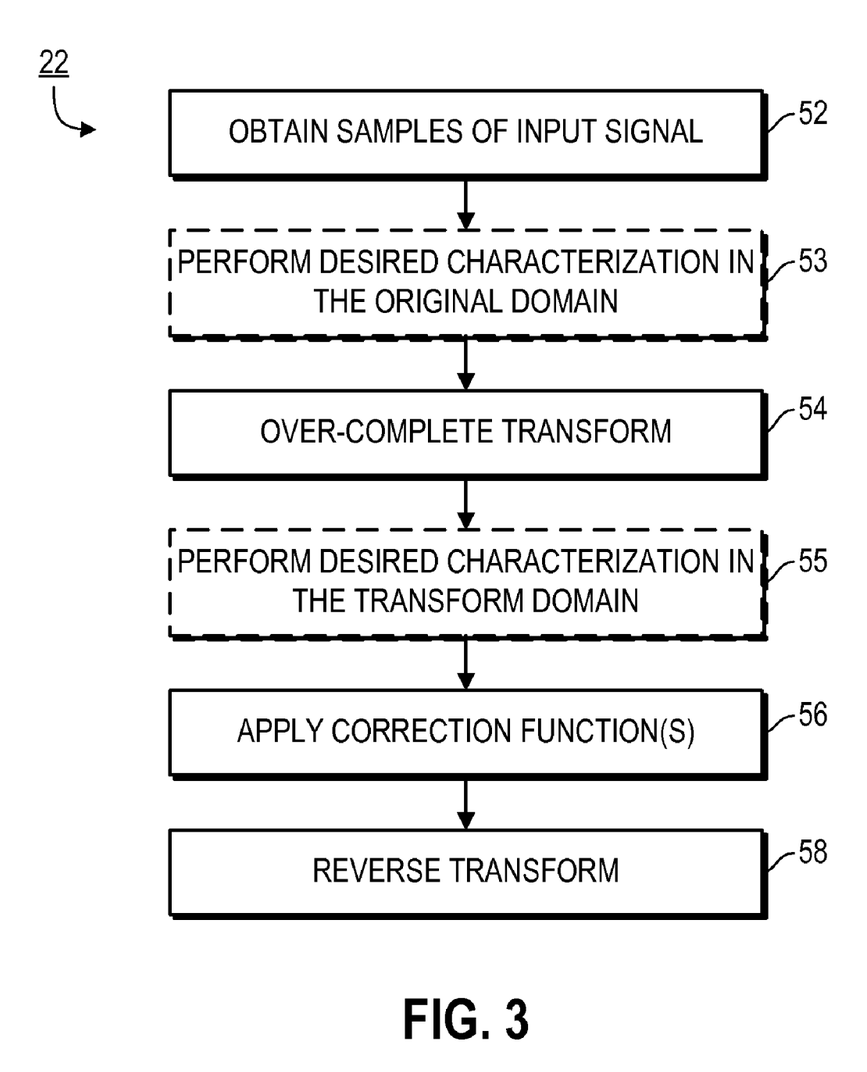
FIG. 3 is a flow diagram illustrating a signal-correction process according to a representative embodiment of the present invention.

FIG. 3 is a flow diagram illustrating a signal-correction process according to an embodiment of the present invention. The technique shown in FIG. 3 can be implemented in software, hardware, firmware or any combination thereof.

Initially, in step 52 samples are obtained for an input signal (e.g., an image signal). In this regard, the input signal may be in an analog format and sampled, or else the input signal may be in a sampled format and the samples are input directly.

Next, in step 53 any desired characterization is performed while the input signal remains in the original (e.g., spatial or time) domain. As discussed in more detail below, the characterization performed in this step 53 can be global, local or any combination and/or may be directed toward characterizing aspects of the signal itself (e.g., the kind of image, such as whether the image or portion thereof is smoothly varying or has sharp transitions), characterizing the noise in the signal (e.g., the level of noise), or both. It is noted that this step 53 is optional and is included in only some of the embodiments of the present invention.

In step 54 the input samples are transformed from the original domain into a transform domain, e.g., using the same transformation technique that was used in step 14 (shown in FIG. 1 and described above). As with step 14, the present transformation preferably is over-complete. Also, the same considerations regarding specific types of transformations apply here as discussed above with respect to step 14.

In step 55 any desired characterization is performed in the transform domain. The potential types of characterization are the same as discussed above in connection with step 53, although the specific techniques for performing such characterization generally are different in the transform domain as compared to the original domain. This step 55 also is optional and is included in only some of the embodiments of the present invention.

In step 56, the correction function that was generated in step 20 (discussed above and shown in FIG. 1) is applied to the transform domain coefficients. More preferably, as discussed in more detail below, e.g., in section III, multiple different sets of correction functions (e.g., for different image types and/or for different noise types and levels) preferably previously were generated using corresponding different training signals. One or more sets of specific correction functions preferably are selected and applied in this step 56, based on the characterizations made in step 53 and/or step 55. Additional details regarding the selection and application of the correction functions are discussed below, e.g., in section III.

The correction function(s) can be applied in any of a variety of different ways, depending on the manner in which such function(s) originally were stored in step 20. Keeping with the piecewise linear correction example discussed above, the correction function(s) may be applied using a lookup table, direct implementation of the piecewise linear function(s), or by applying the SLT to the transform domain coefficients, and then substituting p for q in order to recover the corrected coefficients, as described, e.g., in sections V(c) and V(d) below.

Finally, in step 58 the corrected transform coefficients are transformed back into the original domain in order to obtain the corrected signal.

III. Adaptive Applications of Correction Functions

Figure 4:
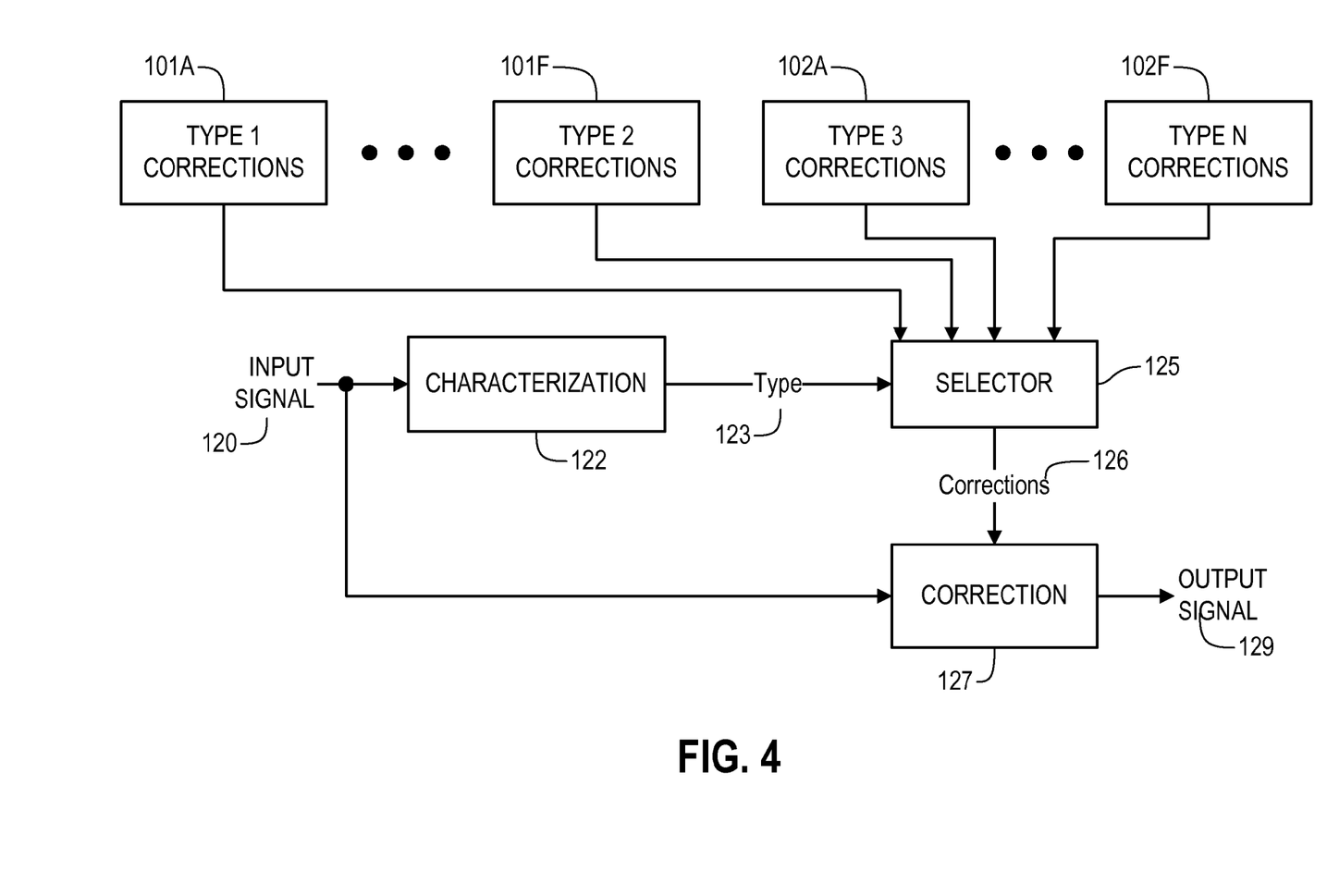
FIG. 4 is a block diagram illustrating signal correction according to a first set of preferred embodiments of the present invention, in which the entire input signal is characterized and corrected homogeneously.
Figure 5:
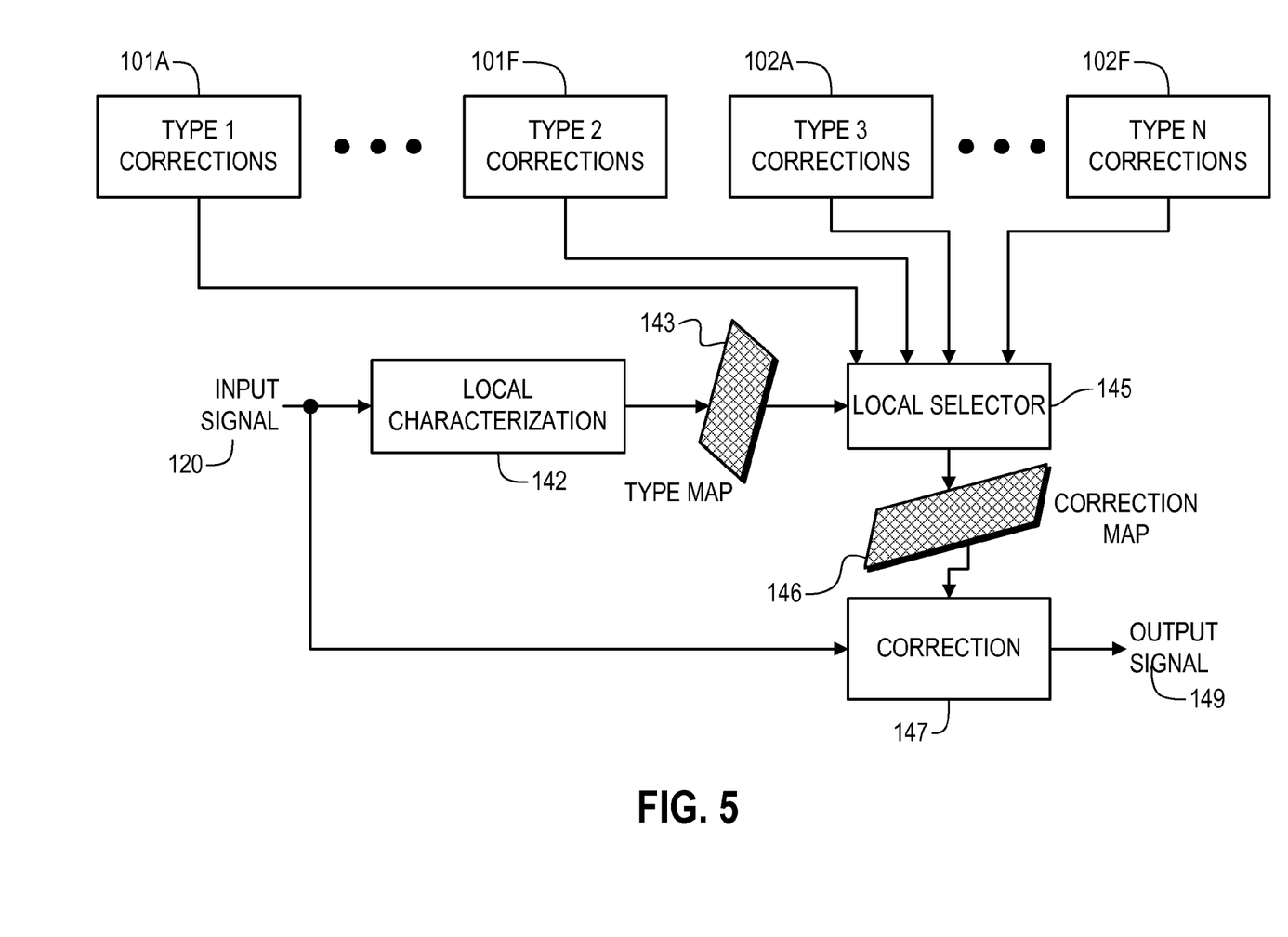
FIG. 5 is a block diagram illustrating signal correction according to a second set of preferred embodiments of the present invention, in which the input signal is characterized and corrected locally.
Figure 6:
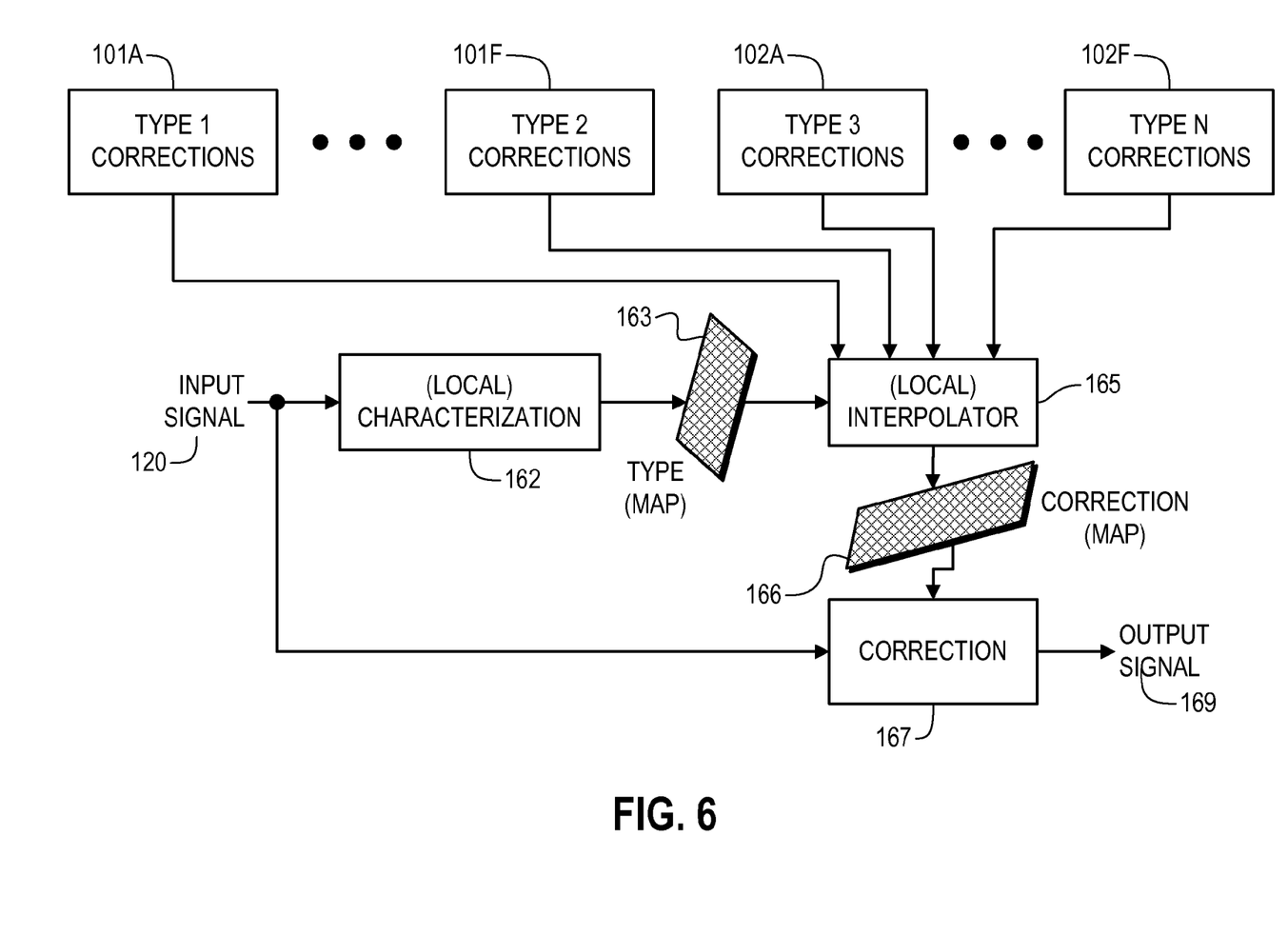
FIG. 6 is a block diagram illustrating signal correction according to a third set of preferred embodiments of the present invention, in which multiple correction functions are used for the same portions of the input signal, using interpolation.

As indicated above, the present invention contemplates application of different correction functions depending upon different characterizations of the input signal and/or the noise that has been added to the input signal (see, e.g., steps 53 and 55 in FIG. 3). In different embodiments, the selection and application of the appropriate correction functions are performed in different ways, as indicated in FIGS. 4-6. FIGS. 4-6 may be implemented in software, hardware, or firmware or any combination thereof.

As shown, the various embodiments all assume that a number of different correction functions (e.g., corrections 101A-101F and 102A-102F) have been generated, e.g., according to the method shown in FIG. 2. Such correction functions preferably were generated using different types of training examples, corresponding to different types of signals and/or different types of noise, corruption or enhancement processing.

In one example, there is a first set of correction functions 101A-101F, with each of the five correction functions in the set corresponding to natural images having a different level of white Gaussian noise added, and a second set of correction functions 102A-102F, with each of the five correction functions corresponding to graphics images having a different level of white Gaussian noise added. Similarly, there might be a set of correction functions corresponding to graphics images with different levels of a particular type of de-blurring. Generally speaking, the differences among the techniques illustrated in FIGS. 4-6 are manifested in how the particular correction functions are selected and applied.

In FIG. 4, an input signal 120 is first characterized 122 in terms of its signal type and/or corrupting influences. For example, processing block 122 might determine that an input image is a natural image or a graphics image. In embodiments involving noise correction, typically, the type of noise already will have been established and any characterization in terms of noise therefore preferably is limited to the level of noise. In addition, or instead, block 122 can be configured to detect other levels of corruption (e.g., the amount of blurring). Any known technique can be used for characterizing the image by type or by corruption level and, as noted above, such characterization can be performed in the original domain and/or in the transform domain.

The output type 123 therefore can include information about the signal type and/or about noise or other corruption included in the signal. In the preferred embodiments, the output type 123 is a discrete value for the entire input signal 120 (i.e., determined on a global basis) that preferably corresponds directly to one of the correction types, e.g., one of correction functions 101A-101F.

Accordingly, selector 125 preferably uses the designation 123 to retrieve the appropriate correction function 126, which it then supplies to correction-processing block 127. If the received type 123 does not precisely match one of the correction functions, e.g., one of 101A-101F, then selector 125 preferably selects the correction function 101A-101F that most closely matches received type information 123. For example, selector 125 preferably selects the correction function 101-104 that corresponds to the same image type as indicated in information 123 and that has a noise level that is closest to that indicated in information 123.

The input signal 120 also is provided to the correction-processing block 127, which performs any processing 22 that has not already been performed by characterization block 122 in order to apply the selected corrections to input signal 120. The result of such processing is output as corrected signal 129.

In the technique of FIG. 5, a local signal characterization block 142 characterizes the input signal 120 in a similar manner to that of global characterization block 122. However, local signal characterization block 142 separately characterizes individual segments, regions or other portions of input signal 120, with the output being a "type map" 143 indicating a type for each such segment, region or portion. Such segments, regions or other portions may be predefined. Alternatively, input signal 120 may be partitioned dynamically based on detections made by local signal characterization block 142.

Based on map 143, local selector 145 selects a correction function from among correction functions 101A-101F and 102A-102F based on the individual type designations. Its output is a correction map 146 that includes a correction function 101-104 for each segment, region or portion of input signal 120. Correction-processing block 147 then processes input signal 120 in a similar manner to that of correction-processing block 127. However, processing block 147 applies a different correction function (e.g., selected from correction functions 101A-101F and 102A-102F) to each different segment, region or portion of input signal 120, as indicated by correction map 146, outputting a corrected signal 149.

FIG. 6 illustrates an alternate technique that may be used in conjunction with either of the techniques illustrated in FIGS. 4 and 5. Thus, characterization block 162, type information 163, correction information 166 and correction-processing block 167 can correspond either to: (i) global characterization block 122, type information 123, correction function 126 and correction-processing block 127, respectively; or (ii) local characterization block 142, type map 143, correction map 146 and correction-processing block 147, respectively.

The technique of FIG. 6 is useful, e.g., for noise correction in which the noise level detected in the input signal 120 (in characterization block 162) does not exactly correspond to any of the noise levels pertaining to one of the available correction functions (e.g., correction functions 101A-101F). In this case, multiple correction functions preferably are retrieved by interpolator 165 for each designation in type information 164 (e.g., one corresponding to an immediately lower noise level and one corresponding to an immediately higher noise level). Then, the multiple correction functions are synthesized in interpolator 165 by interpolating between the multiple correction functions (either globally or locally, depending upon the embodiment). Interpolated correction information 166 (which is either a single value or a map, again depending upon the embodiment) is output and provided to correction-processing block 167, which outputs the corrected signal 169.

In a somewhat modified embodiment to that described above, it is noted that interpolator 165 can be replaced with a selector that merely selects and provides multiple correction functions for each designation in type information 163. In such embodiments, the interpolation function instead is provided in correction-processing block 167.

IV. Alternate Embodiments

In the embodiments described above, the SLT is applied to transform-domain coefficients (e.g., steps 16, 18 and 20 in FIG. 1 and step 56 in FIG. 3). However, it should be understood that the SLT also can be applied and used for correcting a signal in the original domain (e.g., by omitting step 14).

Also, in most of the embodiments discussed herein, the correction function is piecewise linear. This is a direct result of the fact that each coefficient (or other sample) value is expressed in the SLT of the previously discussed embodiments as a linear combination of the two immediately adjacent bin boundary values. However, it should be understood that the present invention is more generally applicable. That is, the SLT matrix itself is a nonlinear function of the input coefficient (or other signal) values. Nevertheless, once generated, the SLT matrix expresses those input values as a linear combination of defined values (represented herein by the q vector) that are fixed across the training examples.

The SLT can be applied such that each coefficient value (or other sample value, e.g., if applied in the original domain) is represented as a linear combination of any number of the defined values (i.e., any number of the q elements), while generally retaining the beneficial properties described herein. For example, instead of defining a coefficient with respect to an upper and lower bounding bin boundaries (e.g., FIG. 2) as described in the preceding embodiments, samples can be represented by a linear combination of three defined values (e.g., the nearest three, or the two immediately below and the one immediately above). In fact, any linear basis that describes the correction functions can be applied in a similar manner, where the vector q represents in this case a set of coefficients that multiply the basis functions.

It is noted that most of the embodiments described in detail herein can be thought of as generating a piecewise linear approximation to some underlying correction function. In a similar vein, by appropriately choosing the weighting function for a higher-order SLT, it may be possible to obtain a higher-order polynomial (or an appropriate non-polynomial) more smoothly varying representation of the desired underlying correction function. Such added flexibility with respect to the shape of the approximation function may be able to provide better results with fewer defined values (e.g., a smaller slicing vector q).

Finally, in the discussion set forth in Section V below, the mathematical foundations for the techniques described above are deprived by assuming that a slicing vector q is defined in advance and a modified vector p is determined based on a comparison of the uncorrected and corrected signals. However, in certain embodiments of the invention, p is defined in advance and q is determined based on a comparison of the uncorrected and corrected signals, thereby providing better control over the sampling of the underlying nonlinear mapping function.

V. Mathematical and Theoretical Background, Analysis, and Support a. Image Restoration in Unitary Transform Domains

The justification for using scalar mapping functions as the SFs in the wavelet domain can be shown to emerge from the MAP estimation and the independence assumption of the wavelet coefficients. Representative embodiments of the present invention assume a degradation model as described in Eq. (1.1). The MAP solution $\hat{x}(y)$ is the image that maximizes the a-posteriori probability:

$$\hat{x}(y) = \underset{x}{\mathrm{argmax}} P(x \mid y) \quad (1.2)$$

This maximization can be expressed in the wavelet domain as well. Denoting the wavelet transforms $x_w = Wx$ and $y_w = Wy$, the MAP estimation gives:

$$\hat{x}_W(y_W) = \underset{x_W}{\mathrm{argmax}} P(x_W \mid y_W) \quad (1.3)$$

Using the Bayes conditional rule and exploiting the monotonicity of the log function, the maximization in Eq. (1.3) is equivalent to:

$$\hat{x}_W = \underset{x_W}{\mathrm{argmax}} P(y_W \mid x_W) P(x_W) = \underset{x_W}{\mathrm{argmin}} \{-\log P(y_W \mid x_W) - \log P(x_W)\} \quad (1.4)$$

The first term, $\log P(y_w \mid x_w)$, is referred to as the likelihood term. It depends solely on the noise characteristics. In the case of white noise this term reduces to:

$$-\log P(y_W \mid x_W) = \lambda \|x_W - y_W\|^2 = \lambda \sum_i \|x_W^i - y_W^i\|^2 \quad (1.5)$$

where $x_W^i$ and $y_W^i$ denote the $i^{th}$ elements of the corresponding vectors and $\lambda$ is a constant depending on the noise variance. The second term in Equation (1.4), $\log P(x_w)$, is known as the regularization term or the prior term as it specifies the a-priori probability of the original image $x_W$. Taking into account the independence assumption of the wavelet coefficients, the second term can be rewritten as:

$$-\log P(x_W) = -\log \prod_i P_i(x_W^i) = -\sum_i \log P_i(x_W^i) \quad (1.6)$$

Substituting Equations (1.5) and (1.6) into Equation (1.4) the overall minimization amounts to a set of independent scalar minimizations, each of which corresponding to a particular coefficient:

$$\hat{x}_W^i(y_W^i) = \underset{x_W^i}{\mathrm{argmin}} \{\lambda \|x_W^i - y_W^i\|^2 - \log P_i(x_W^i)\} \forall i \quad (1.7)$$

Equation (1.7) gives the justification for applying a scalar SF to each wavelet coefficient independently. Each value $y_W^i$ is mapped to: $\hat{x}_W^i = M_W^i \{y_W^i\}$ which is given in Eq. (1.7). Note that for a particular noise variance, the variations in the SFs $M_W^i \{\cdot\}$ depend on $P_i(x_W^i)$. Furthermore, assuming the statistics of natural images are homogeneous, it implies that all wavelet coefficients belonging to a particular wavelet band share the same distribution. Namely, without loss of generality, if a coefficient $x_W^i$ belongs to the $j^{th}$ band where j=band (i)

$$P_i(x_W^i) = P_{band(i)}(x_W^i)$$

and $$\hat{x}_W^i = M_W^{band(i)} \{y_W^i\} \quad (1.8)$$

As a result, if the wavelet transform is composed of K bands, only K distinct SFs are evaluated.

b. Restoration in Over-Complete Domains

Although the shrinkage approach using unitary transforms (which result in n coefficients for n signal values) provides good results, significant improvement is achieved when implementing this technique using over-complete representations. In most cases, this is implemented using the undecimated wavelet transform or any other sliding windowed transforms (sliding local DCT, sliding local DFT, steerable pyramid, etc.).

The undecimated wavelet transform can be viewed as applying an orthogonal transform to a set of shifted versions of the image. The shrinkage operation is applied to each transformed image (i.e., each shifted version) independently. This is followed by transforming each modified transform back to the image space and then averaging all the corrected images after shifting them back to their original positions. This procedure may be termed cycle-spinning denoising.

The cycle-spinning approach can also be viewed as a single shrinkage operation applied to an over-complete transform. Since the transform of a spatially shifted image can be applied equivalently by shifting the transform basis (by the same amount but in the opposite direction), it is possible to define a set of transforms:

$$y_{W_i} = WS_i y = W_i y \quad i=1\ldots N$$

where $S_i y$ denotes the $i^{th}$ shift of an image y, and the matrix $W_i = WS_i$ is composed of the wavelet basis after applying the respective shift. Given a set of different shifts, the entire transform can be specified as:

$$y_W = Wy \quad (1.9)$$

where now $$W = \begin{bmatrix} W_1 \\ W_2 \\ \vdots \\ W_N \end{bmatrix} \text{ and } y_W = \begin{bmatrix} y_{W_1} \\ y_{W_2} \\ \vdots \\ y_{W_N} \end{bmatrix} \quad (1.10)$$

Modifying $y_W$ using a vector of SFs $\vec{M}_W\{y_W\}$ aims at removing the noise components. Hence, it is assumed that:

$$Wx = \vec{M}_W\{WY\}$$

and the LS estimate for x gives:

$$i\ \hat{x} = (W^T W)^{-1} W^T \vec{M}_W\{Wy\} \quad (1.11)$$

In the un-decimated wavelet case, however, Equation (1.11) can be simplified due to the fact that W is a tight frame, namely $$\frac{1}{N} W^T W = \frac{1}{N} \sum_i W_i^T W_i = I$$

Additionally, assuming that the SFs are identical for each wavelet transform $W_i$, i.e: $\vec{M}_{W_i} = \vec{M}_W$, $\forall i=1\ldots N$, Equation (1.11) can be rewritten:

$$\hat{x} = \frac{1}{N} W^T \vec{M}_W\{Wy\} = \frac{1}{N} \sum_i W_i^T \vec{M}_W\{W_i y\} \quad (1.12)$$

Equation (1.12) spells out the cycle-spinning procedure.

Viewing the cycle-spinning approach as a set of independent shrinkage operations applied to a set of unitary transforms might suggest that the SFs applied are similar to those applied in a single unitary case [Eq. (1.7)]. Nevertheless, this is not the case. Considering the entire over-complete transform [Eq. (1.9)] makes it clear that even if statistical independence is assumed in the coefficients $y_{W_i}$ belonging to a single transform $W_i$, such an assumption cannot be extended to coefficients belonging to different transforms, e.g. $y_{W_i}$ and $y_{W_j}$, $i \neq j$. Thus, a new set of SFs should be designed that takes into consideration the inter-transform dependencies.

Another issue that causes the over-complete case to differ from the unitary case is the domain in which the minimization criterion is applied. To clarify this point, consider finding the optimal SFs for the unitary case with respect to the MSE criterion, namely, finding $\vec{M}_W$ that minimizes $$\epsilon = E_{x|y}\{\|\hat{x}(y) - x\|^2\}$$

where it has been determined that $\hat{x}(y) = W^T \vec{M}_W\{Wy\}$, and $E_{x|y}\{\cdot\}$ stands for the conditional expectation of x given y. Whenever W is unitary this minimization can be expressed equivalently in the transform domain, namely:

$$E_{x|y}\{\|W^T \vec{M}_W\{Wy\} - x\|^2\} = E_{x|y}\{\|\vec{M}_W\{y_W\} - x_W\|^2\} \quad (1.13)$$

However, for an over-complete transform this equality generally is not valid, implying that the optimization for $\vec{M}_W$ should be expressed in the spatial domain. Unfortunately, due to the fact that the inverse transform couples wavelet coefficients, spatial-domain optimization typically would be far more complex.

Although scalar SFs might not be justified when the transform coefficients are mutually dependant, the superior results of applying scalar SFs in the over-complete case suggest that such an approach still is useful, in addition to its appealing efficiency. Furthermore, in a recent paper scalar SFs are justified as being the $1^{st}$ step in an iterative minimization scheme. Justified as the optimal solution or not, it would be highly desirable to find the best SFs in the over-complete case while considering inter-coefficient dependencies. In most conventional approaches, however, the applied SFs are naively borrowed from the unitary case.

The present techniques provide for image denoising (as well as other types of signal correction) in the over-complete case. The preferred techniques use a discriminative framework in which the SFs are calculated directly from a set of example images, overriding the demanding efforts of modeling statistical priors in high-dimensional spaces. The following section introduces and provides conceptual underpinnings for the Slicing Transform (SLT).

c. The Slicing Transform and its Properties

Let $x \in [a, b) \in R$ be a real value, bounded in the half-open interval [a, b). The interval is divided into M bins whose boundaries form a vector q:

$$q = [q_0, q_1, \ldots, q_M]^T$$

such that $$q_0 = a < q_1 < q_2 \ldots < q_M = b.$$

The value x naturally is associated with a single bin $\pi(x) \in \{1\ldots M\}$, and a corresponding normalized residue, $r(x)$, where $$\pi(x) = j \text{ if } x \in [q_{j-1}, q_j)$$

and $$r(x) = \frac{x - q_{\pi(x)-1}}{q_{\pi(x)} - q_{\pi(x)-1}}.$$

Note that $r(x) \in [0,1)$, where $r(x) = 0$ if $x = q_{\pi(x)-1}$, and $r(x) \to 1$ if $x \to q_{\pi(x)}$. The value x can then be expressed as a linear combination of $q_{\pi(x)}$ and $q_{\pi(x)-1}$, i.e.:

$$x = r(x) q_{\pi(x)} + (1 - r(x)) q_{\pi(x)-1} \quad (1.14)$$

Eq. (1.14) can be rewritten in vectorial form:

$$x = S_q(x) q \quad (1.15)$$

where $S_q(x)$ is defined as an M+1 dimensional row vector, as follows:

$$S_q(x) = [0, \ldots, 0, 1 - r(x), r(x), 0, \ldots, 0] \quad (1.16)$$

and where the values $1-r(x)$ and $r(x)$ are located in the $(\pi(x)-1)^{th}$ and $\pi(x)^{th}$ entries, respectively.

A vectorial extension of Eq. (1.15) is defined as follows. Let x be an N-dimensional vector whose elements satisfy $x^i \in [a, b)$. The Slicing Transform (SLT) of x is defined as follows:

$$x = S_q(x)q \qquad (1.17)$$

where $S_q(x)$ is an $N \times (M+1)$ matrix defined as follows:

$$[S_q(x)](i, j) = \begin{cases} r(x^i) & \text{if } \pi(x^i) = j \\ 1 - r(x^i) & \text{if } \pi(x^i) = j+1 \\ 0 & \text{otherwise} \end{cases} \qquad (1.18)$$

The matrix $S_q(x)$ has N rows each corresponding to an entry in x, and M+1 columns associated with the bin boundaries defined in q. Because every $x^i$ has two adjacent bin boundaries, there are exactly two non-zero values in each row of $S_q(x)$ (with the exception of values $x^i$ equaling a bin boundary value $q_j$). Correspondingly, in each column j the non-zero entries are only in rows i for which $\pi(x^i) = j$ or $\pi(x^i) = j+1$ (i.e., the values $\{x^i\}$ are adjacent to the bin boundary $q_j$).

The SLT (Eq. (1.17)) can be regarded as a linear transform of the signal x, representing it as a linear combination of column vectors of matrix $S_q(x)$. However, unlike traditional transforms where the basis vectors are fixed and the linear combinations vary according to a given signal x, in the SLT the linear combination weights q are fixed while the transform matrix varies according to the signal. Further extending the analogy to traditional transforms, some operations that are complicated to apply in the signal domain can be applied efficiently in the SLT domain. This point will be clear in the paragraphs below.

Figure 7:
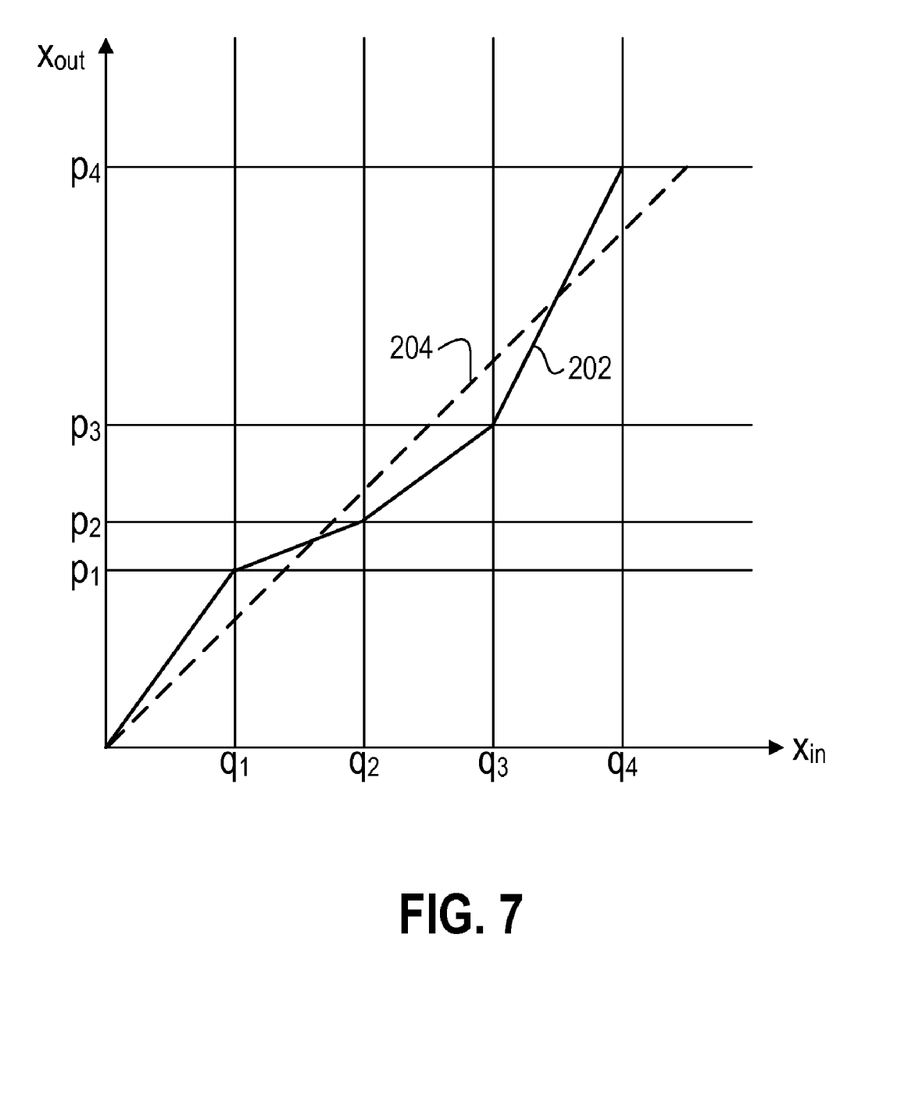
FIG. 7 illustrates a piecewise linear mapping generated by substituting an original vector of defined values q with a one new vector of defined values p, according to a representative embodiment of the present invention.

A unique property of the SLT is the substitution property: Proposition: Substituting the boundary vector q with a different vector p performs a piecewise linear mapping of the values in x:

$$M_{q,p}\{x\} = S_q(x)p$$

where $M_{q,p}\{x\}$ is such that values $\{x \in [q_{j-1}, q_j)\}$ are mapped linearly to the interval $[p_{j-1}, p_j)$. This means that for every $\alpha \in [0,1)$, and $j \in \{1, 2, \ldots M\}$ the value $x = \alpha q_j + (1-\alpha) q_{j-1}$ is mapped to $M_{q,p}\{x\} = \alpha p_j + (1-\alpha) p_{j-1}$. FIG. 7 illustrates this mapping, with function 202 showing the piecewise linear mapping and line 204 showing the identity function.

As a result of this substitution property, a family of non-linear functions can be expressed in a linear matrix form. This result, in turn, enables a simple optimization of the mapping functions as a solution of a linear equation. Thus, by approximating general nonlinear maps as piecewise linear maps, a linear functional can be solved for an "optimal" (piecewise linear) map. Note that a finer quantization grid can always be used, which will result in a better approximation of the desired nonlinear map.

In addition to the substitution property, due to the linear structure of the SLT, any linear operation L applied to x can be applied directly to the SLT representation. This means:

$$L\{x\} = L\{S_q(x)q\} = L\{S_q(x)\}q$$

and consequently:

$$L\{M_{q,p}\{x\}\} = L\{S_q(x)p\} = L\{S_q(x)\}p.$$

Note, however, that once a linear operation has been applied to the SLT, the linear representation loses the SLT form, and thus generally we have that:

$$M_{q,p}\{L\{x\}\} = M_{q,p}\{L\{S_q(x)\}q\} \neq L\{S_q(x)\}p.$$

d. Image Restoration Using the SLT

The restoration technique described in Eq. (1.9) above for the over-compete domain is:

$$y_W = Wy$$

The rows of W are composed of the analysis vectors, the number of which being equal to or larger than the dimensionality of the signal y. Again, the goal is to find a vector of SFs: $\vec{M}_W = [M_W^1, M_W^2, \ldots]$ that would best restore x from $Y_W$ [Eq. (1.11)]. To simplify the explanations, consider first the case where a single SF, $M_W = M_W^i$, $\forall i$, is used for all coefficients $y_W$. Later the proposed approach is extended to include a vector of SFs. The modified coefficients $M_W\{y_W\}$ are designed to restore the original signal x, so from Eq. (1.11) it is assumed that:

$$\hat{x}(y) = (W^T W)^{-1} W^T M_W\{y_W\} \qquad (1.19)$$

If the SF is restricted to be a piecewise linear map, it is possible to apply the substitution property of the SLT and obtain $$y_W = S_q(y_W)q \text{ and } M_{q,p}\{y_W\} = S_q(y_W)p \qquad (1.20)$$

where $M_{q,p}$ describes the piecewise linear approximation of the mapping $M_W$. Using Eq. (1.19), the estimated signal is then given by:

$$\hat{x}(y) = (W^T W)^{-1} W^T S_q(y_W)p \qquad (1.21)$$

The off-line step of the present technique aims at learning the optimal SF to be applied. Namely, the goal is to find the optimal p vector that, together with the q vector, define the piecewise mapping function $M_{q,p}$. The optimal (piecewise) SF with respect to the MSE criterion is obtained by a vector $\hat{p}$ satisfying:

$$\hat{p} = \arg\min_p E_{x|y}\{\|\hat{x}(y) - x\|^2\} \qquad (1.22)$$

where $\hat{x}(y)$ is as given in Eq. (1.21). Because the conditional probability $P(x|y)$ is not available and is complicated to model, the MSE expression is approximated using a set of clean signals $\{x^e\}$ that are given along with their noisy versions $\{y^e\}$. For simplicity, it initially is assumed that only a single signal $x^e$ is given as an example along with its noisy version $y^e$. In such a case, the MSE solution is approximated by the following minimization:

$$\hat{p} = \arg\min_p \|\hat{x}(y^e) - x^e\|^2 \qquad (1.23)$$

It can be shown that the optimal piecewise linear mapping function as defined in Equation (1.23) is given by:

$$\hat{p} = (L^T L)^{-1} L^T x^e \qquad (1.24)$$

where $$L = (W^T W)^{-1} W^T S_q(y_W) \qquad (1.25)$$

Proof:

According to Equations (1.21) and (1.25), $\hat{x}(y^e)$=Lp. Substituting this expression into Eq. (1.23) gives rise to $$\hat{p} = \arg\min_p \|Lp - x^e\|^2.$$

Taking the derivative of the above equation with respect to p and equating it to zero yields the solution in Eq. (1.24).

In fact, the SF in Eq. (1.24) is designed to optimally reconstruct the clean example from its noisy counterpart. The obtained SF is then used for denoising new signals that are assumed to have similar statistical characteristics as the training example (signal and noise). Clean and noisy examples can be acquired prior to and following the degradation process (e.g. before and after a noisy channel, before and after JPEG compression, etc.). If clean versions of noisy signals are not readily available, then the degradation process preferably is modeled and noisy signals are simulated from clean examples.

The solution is now extended to the case where a vector of SFs is sought. Considering again the un-decimated wavelet transform (Eq. (1.9)) and the insight [Eq. (1.8)] that mapping functions applied to wavelet coefficients belonging to the same wavelet band are identical. The rows of the over-complete transform W in Eq. (1.10) are reordered so that transform rows corresponding to a wavelet band are co-located in a block. Naturally, the same reordering is extended to $y_W$. Assuming there are K different wavelet bands and a corresponding permutation matrix P:

$$B = PW = \begin{bmatrix} B_1 \\ B_2 \\ \vdots \\ B_K \end{bmatrix} \text{ and } y_B = By = \begin{bmatrix} y_{B_1} \\ y_{B_2} \\ \vdots \\ y_{B_K} \end{bmatrix} \quad (1.26)$$

where $y_{B_i}$ represents the coefficients in the $i^{th}$ band. In the new reordering, a vector of SFs, $\vec{M}_B = [M_B^1, M_B^2, \ldots, M_B^K]$, is applied as follows: because $M_B^k$ is applied individually to all coefficients in the $k^{th}$ band, Eq. (1.19) can be rewritten as:

$$\hat{x} = (B^T B)^{-1} \vec{M}_B\{y_B\} = (B^T B)^{-1} \sum_{k=1}^{K} B_k^T M_B^k\{y_{B_k}\} \quad (1.27)$$

where:

$$(B^T B)^{-1} = \left(\sum_{k=1}^{K} B_k^T B_k\right)^{-1}$$

In contrast to the above case [Eq. (1.19))] different SFs are applied to different $y_{B_k}$. The SFs are again restricted to be piecewise linear, where:

i $y_{B_k} = S_{q_k}(y_{B_k}) q_k$ and $M_{q_k p_k}(y_{B_k}) = S_{q_k}(y_{B_k}) p_k$ and $M_{q_k p_k}$ describes the piecewise linear approximation of the mapping $M_B^k$. Accordingly, Eq. (1.27) can be rewritten as:

$$\hat{x}(y) = (B^T B)^{-1} \sum_{k=1}^{K} B_k^T S_{q_k}(y_{B_k}) p_k \quad (1.28)$$

Similar to the above, having $x^e$ and $y^e$ as examples, the goal is to find the optimal p that will minimize:

$$\hat{p} = \arg\min_p \|\hat{x}(y^e) - x^e\|^2 \quad (1.29)$$

but now p is a K(M+1) dimensional vector constructed by stacking all $p_k$:

$$p = \begin{bmatrix} p_1 \\ p_2 \\ \vdots \\ p_K \end{bmatrix}$$

The optimal set of piecewise linear mapping functions that minimizes Equation (1.29) is given by:

$$\hat{p} = (\tilde{L}^T \tilde{L})^{-1} \tilde{L}^T x^e \quad (1.30)$$

where $\tilde{L}$ is composed of all the slicing matrices:

$$\tilde{L} = (B^T B)^{-1} [B_1^T S_{q_1}(y_{B_1}^e) \ldots B_K^T S_{q_K}(y_{B_K}^e)] \quad (1.31)$$

Proof: From Eq. (1.28):

$$\hat{x}(y^e) = (B^T B)^{-1} \sum_k^K B_k^T S_{q_k}(y_{B_k}^e) p_k = \tilde{L} p \quad (1.32)$$

The rest of the proof is similar to the proof given in Claim 1, by substituting matrix L with matrix $\tilde{L}$.

The above claim gives the optimal K SFs to be applied to K different wavelet bands. In the un-decimated transform cases, the term $B_k^T S_{q_k}(y_{B_k}^e)$ can be calculated efficiently by applying a two-dimensional convolution to each of the slicing images composing the columns of $S_{q_k}(y_{B_k}^e)$.

Figure 8:
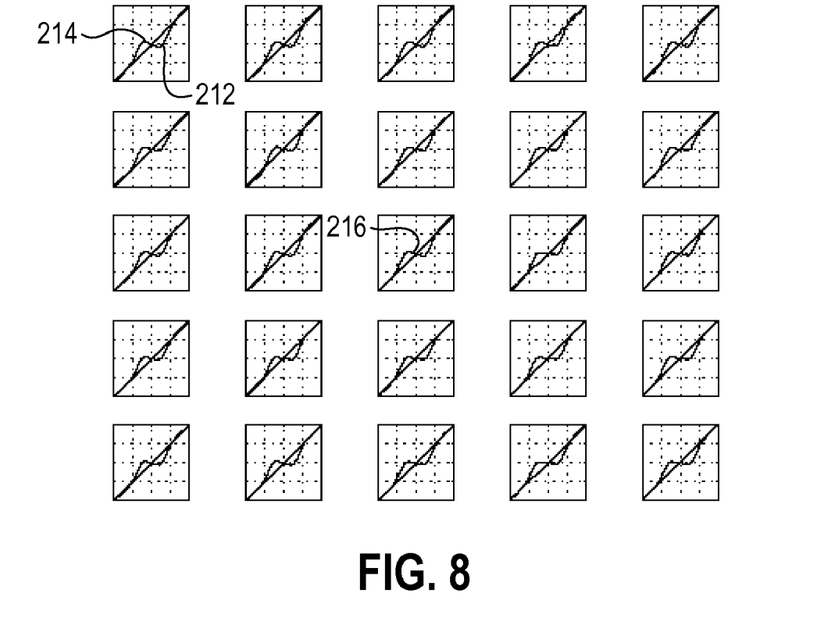
FIG. 8 illustrates shrinkage functions generated using a SLT-based technique according to a representative embodiment of the present invention.
Figure 9:
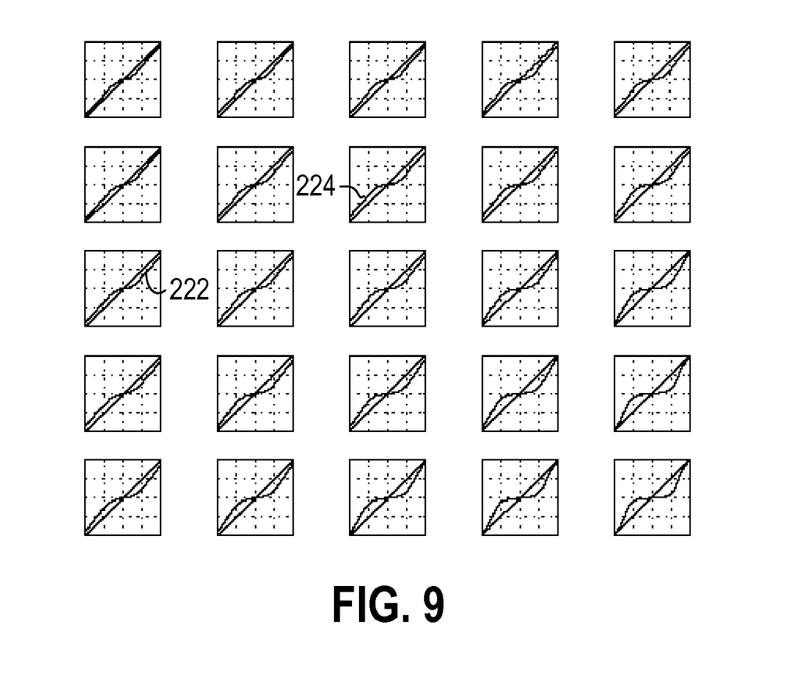
FIG. 9 illustrates shrinkage functions generated using a conventional technique.

An example of SFs generated using the foregoing SLT-based technique is given in FIG. 8, while FIG. 9 illustrates shrinkage functions generated using a conventional technique. In each case, the filters used were 8×8 DCT, the SFs shown are for the DCT bands whose indices are: [2 . . . 6]× [2 . . . 6] (left to right—top to bottom), and dotted lines are plotted at values −60,0,60 on each axis. As shown in FIG. 8, the shrinkage functions generated by the SLT-based technique have portions 212 in which positive coefficients are mapped to negative values and portions 214 in which negative coefficients are mapped to positive values, requiring regions (e.g., region 216) having a negative slope. This is in contrast to the SFs (e.g., 222 and 224) generated by the conventional technique, which are monotonically non-decreasing and in which coefficient value signs are preserved after the correction.

e. Implementation Considerations

The theoretical structure of the suggested approach was introduced above. However, several computational issues are critical to the implementation of the approach and are addressed in this section.

The first issue is related to the kurtotic distributions of the wavelet coefficients. In such distributions, the vast majority of the coefficient values are close to zero while only a negligible fraction of the coefficients depart from zero. This behavior may give rise to an over-fitting phenomena in the higher part of the mapping domain, where a small number of measured coefficients are available. In more severe cases there are quantization bins without any sample values at all, and the matrix $\tilde{L}^T\tilde{L}$ in Eq. (1.30) then becomes singular or ill-posed. In order to resolve this problem, it is preferable to incorporate a regularization term in the minimization technique. Referring to Eq. (1.29) a regularization term can be added as follows:

$$\hat{p} = \arg\min_p \{\|\hat{x}^e - x^e\|^2 + \sqrt{\lambda}\,\|p - q\|^2\}.$$

The regularization term deviates the solution of p towards q, particularly in p entries where limited sampled data are available. As a result, the mapping function will be close to the identity in such p values. The constant parameter $\lambda$ controls the influence strength of the regularization term. In an experimental implementation, $\lambda=(0.005N/M)^2$ was used, where N is the number of image pixels, and N/M is the average number of pixels per quantization bin. It can be easily verified that the final solution of this system gives:

$$\hat{p} = (\tilde{L}^T\tilde{L} + \lambda I)^{-1}(\tilde{L}^T x^e + \lambda q) \qquad (1.33)$$

where I denotes a K(M+1)×K(M+1) identity matrix.

Another issue to address is how to deal with transform coefficients whose values fall outside the domain interval. Since the SLT transform assumes a limited range of transform coefficients, namely the range [$q_0$, $q_M$), there might be cases where the coefficients fall outside this range. In such cases, the influence of these coefficients on the desired solution preferably is ignored by adding an additional term to the SLT definition [q. (1.17)] as follows:

$$x = S_q(x)q + h$$

where the residual term h includes all entries in x whose values are outside the range [$q_0$, $q_M$). In the present restoration technique, this gives:

$$M_{q_k, p_k}\{y_{B^e_k}\} = S_{q_k}(y_{B^e_k})p_k + h^e_k$$

Inserting this term into Eq. (1.32) gives:

$$\hat{x}^e = \tilde{L}p + \tilde{h}^e \text{ where } \tilde{h}^e = (B^TB)^{-1}\sum_k B_k^T h_k^e \qquad (1.34)$$

This updates the final solution, which now gives:

$$\hat{p} = (\tilde{L}^T\tilde{L} + \lambda I)^{-1}(\tilde{L}^T(x^e - \tilde{h}^e) + \lambda q) \qquad (1.35)$$

Accordingly, during the restoration process, the piecewise mapping functions are applied only to in-range coefficients while out-of-range coefficients are left untouched.

In the previous sections it was assumed that a single example image, $x^e$, was used to learn the mapping functions. In practice, however, a single image might not provide the correct properties of the underlying statistics. Hence, it is preferable to learn the MFs from several images. Adding more images into the system can be implemented easily by incorporating all image equations together into a single equation and proceeding as above. If there are t example images, denoted $x_1^e \ldots x_t^e$, Eq. (1.34) is extended to:

$$\begin{bmatrix}\tilde{L}_1\\ \vdots\\ \tilde{L}_t\end{bmatrix}p + \begin{bmatrix}\tilde{h}_1^e\\ \vdots\\ \tilde{h}_t^e\end{bmatrix} = \begin{bmatrix}\hat{x}_1^e\\ \vdots\\ \hat{x}_t^e\end{bmatrix}$$

where $\tilde{L}_i$ and $\tilde{h}_i^e$ are calculated as defined above for a single image.

In practice, however, a direct implementation of the above equation might be prohibitive due to memory limitations. Note, that the dimensions of matrix $\tilde{L}$ in Eq. (1.31) is N×K(M+1) where N is the number of pixels in the example image. Fortunately, there is no need to construct the full equation in order to solve for p. The solution $\hat{p}$ minimizing the MSE cost function:

$$\hat{p} = \arg\min_p \sum_i^t \|\hat{x}(y_i^e) - x_i^e\|^2$$

gives rise to the following solution which replaces Eq. (1.35) above:

$$\hat{p} = \left(\sum_i^t (\tilde{L}_i^T \tilde{L}_i) + \lambda I\right)^{-1} \left(\sum_i^t \tilde{L}_i^T(x_i^e - \tilde{h}_i^e) + \lambda q\right)$$

Note that the dimensions of $\tilde{L}_i^T\tilde{L}_i$ is K(M+1)×K(M+1) where, commonly, K(M+1)<<N. Therefore, implementing the above solution needs only a memory capacity on the order of (KM$^2$) which is independent of the number of images. This technique can be implemented also to a single image if its size is too large. In such a case, the image is split into several sub-images, each of which being treated as a separate image.

The marginal distributions of the wavelet coefficients are known to be symmetric, i.e., $P_i(x^i) = P_i(-x^i)$. This gives rise to symmetric SFs as well. Exploiting this fact, it is possible to limit the SLT interval to include only the positive part of the mapping domain. In this case, the q values are all positive: $q = [q_0 \ldots q_M]$ where $q_0 = 0$. The SLT equation $x = S_q(x)q + r$ is still correct if the definition of $S_q(x)$ is modified as follows:

$$[S_q(x)](i, j) = \begin{cases} \text{sign}\{x^i\}r(x^i) & \text{if } \pi(|x^i|) = j \\ \text{sign}\{x^i\}(1 - r(x^i)) & \text{if } \pi(|x^i|) = j+1 \\ 0 & \text{otherwise} \end{cases}$$

There are two advantages using the new definitions. First, the size of the linear system to be solved is half the size of the original system, thereby enabling better efficiency in memory allocation. Second, pulling more pixel values to the available bins stabilizes the solution and reduces the chance of over-fitting.

An important parameter in the proposed technique is the number of quantization bins used in the Slicing Transform. The greater the number of bins used the more flexibility is gained for the generated SFs (although at the expense of computational burden). It was experimentally demonstrated that relatively few quantization bins (15 bins in experimental settings) produce superior results which are very close to the asymptotic quality. Additionally, because small wavelet values are much more probable that higher values, it is preferable to implement a non-uniform quantization in which quantization boundaries are populated more densely in the lower part of the mapping domain. In experiments, a polynomial scaling to the mapping domain was implemented, in which a unit interval t∈[0,1] is transformed to a mapping domain s∈[a, b] through a polynomial function: $s=t^\beta \cdot (b-a)+a$, for $\beta>1$.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of processing an input signal, comprising:
obtaining input signal samples that represents a physical quantity;
transforming the input signal samples from an original domain into a plurality of coefficients in a transform domain, using an over-complete transform, such that the plurality of coefficients is sufficient to redundantly reconstruct the input signal samples;
modifying the coefficients independently of each other by applying a correction function, thereby obtaining a set of corrected coefficients; and
transforming, by a computer, the set of corrected coefficients back to the original domain,
wherein the correction function is determined by using a set of training pairs, each training pair including an uncorrected signal and a corrected signal, and by reducing a specified aggregate measure of error between the uncorrected signal and the corrected signal in the original domain across the training pairs.

2. A method according to claim 1, wherein the specified aggregate measure of error comprises a mean square error.

3. A method according to claim 1, wherein the correction function is piecewise linear.

4. A method according to claim 1, wherein the correction function is a linear combination of basis functions.

5. A method according to claim 1, wherein the input signal comprises an image signal.

6. A method according to claim 1, further comprising steps of analyzing the input signal and selecting the correction function based on results of said analyzing step.

7. A method according to claim 1, wherein different portions of the input signal are corrected by applying different correction functions.

8. A method of generating a correction function for use in signal processing, comprising:
   obtaining a set of training pairs, each training pair including a base signal and a target signal, each representing a physical quantity;
   identifying an original set of defined values that is constant across the set of training pairs;
   specifying samples for the base signals as linear combinations of the defined values in the original set;
   replacing the original set of defined values with a new set of defined values that result in modified base signals when the linear combinations are applied, the new set selected so as to achieve a specified goal relating to a comparison between the modified base signals and the target signals across the set of training pairs; and
   identifying, by a computer, a correction function based on a comparison between the original set of defined values and the new set of defined values.

9. A method according to claim 8, wherein the linear combinations are held constant while the original set of defined values is replaced with the new set of defined values.

10. A method according to claim 8, further comprising a step of using the correction function to modify input signal values.

11. A method according to claim 10, wherein the correction function is used to modify each transform coefficient corresponding to a given input signal independently of the other transform coefficients corresponding to the given input signal.

12. A method according to claim 8, further comprising steps of transforming values of the base signals into coefficients in a transform domain and using the coefficients as the samples in said specifying step.

13. A method according to claim 12, wherein the transforming step uses an over-complete transform, such that the coefficients are sufficient to redundantly reconstruct the base signals.

14. A method according to claim 12, wherein the specified goal comprises reduction of a specified measure of error between the modified base signals and the target signals.

15. A method according to claim 14, wherein the transforming step comprises a linear transformation, permitting the specified goal to be stated as a function of a matrix representing the linear combinations.

16. A method according to claim 14, wherein the specified goal comprises a reduction of a mean square error.

17. A method according to claim 8, wherein each sample is specified as a linear combination of exactly two of the defined values, and wherein the correction function is piecewise linear.

18. A method according to claim 8, wherein the training pairs are generated by intentionally corrupting a plurality of target signals to obtain the base signals.

19. A non-transitory computer-readable medium storing computer-executable process steps stored therein for correcting an input signal, said process steps comprising:
   obtaining input signal samples that represents a physical quantity;
   transforming the input signal samples from an original domain into a plurality of coefficients in a transform domain, using an over-complete transform, such that the plurality of coefficients is sufficient to redundantly reconstruct the input signal samples;
   modifying the coefficients independently of each other by applying a correction function, thereby obtaining a set of corrected coefficients; and
   transforming, by a computer, the set of corrected coefficients back to the original domain,
   wherein the correction function is determined by using a set of training pairs, each training pair including an uncorrected signal and a corrected signal, and by reducing a specified aggregate measure of error between the uncorrected signal and the corrected signal in the original domain across the training pairs.

20. A computer-readable medium according to claim 19, wherein the correction function is piecewise linear.

* * * * *